(12) United States Patent
Warren et al.

(10) Patent No.: US 12,723,573 B2
(45) Date of Patent: Sep. 1, 2026

(54) SOLID STATE THERMODYNAMIC CYCLE

(71) Applicant: Exergyn Limited, Dublin (IE)

(72) Inventors: Keith Warren, Dublin (IE); Richard Blackburn, Dublin (IE)

(73) Assignee: EXERGYN LIMITED, Dublin (IE)

( * ) Notice: Subject to any disclaimer, the term of this patent is extended or adjusted under 35 U.S.C. 154(b) by 0 days.

(21) Appl. No.: 18/852,293

(22) PCT Filed: Mar. 28, 2023

(86) PCT No.: PCT/EP2023/058061
§ 371 (c)(1),
(2) Date: Sep. 27, 2024

(87) PCT Pub. No.: WO2023/186939
PCT Pub. Date: Oct. 5, 2023

(65) Prior Publication Data

US 2025/0215862 A1 Jul. 3, 2025

(30) Foreign Application Priority Data

Mar. 28, 2022 (GB) .................................... 2204339

(51) Int. Cl.
*F03G 7/06* (2006.01)
*C09K 5/14* (2006.01)

(52) U.S. Cl.
CPC .............. *F03G 7/0614* (2021.08); *C09K 5/14* (2013.01)

(58) Field of Classification Search
CPC ................................ F03G 7/0614; C09K 5/14
See application file for complete search history.

(56) References Cited

U.S. PATENT DOCUMENTS

2016/0208783 A1* 7/2016 Cullen ................ F03G 7/06143
2022/0299243 A1* 9/2022 O'Toole .................. F03G 7/062
2022/0357083 A1* 11/2022 O'Toole .................. F25B 30/00

FOREIGN PATENT DOCUMENTS

WO 2021023680 A1 2/2021
WO WO-2021023687 A1 * 2/2021 .............. F25B 30/00

OTHER PUBLICATIONS

Qian Suxin et al: "Thermodynamics cycle analysis and numerical modeling of thermoelastic cooling systems", International Journal of Refrigeration, Elsevier, Amsterdam, NL, vol. 56, Apr. 14, 2015 (Apr. 14, 2015), pp. 65-80, xp029249025, ISSN: 0140-7007, DOI: 10.1016/J.IJREFRIG.2015.04.001.

(Continued)

*Primary Examiner* — Shafiq Mian
(74) *Attorney, Agent, or Firm* — Nixon Peabody LLP

(57) ABSTRACT

Disclosed is a method for implementing a thermodynamic cycle for an elastocaloric material. The method includes increasing a stress applied on the elastocaloric material, till the stress reaches a desired stress value or the elastocaloric material transitions from austenite to martensite form, decreasing a temperature of the elastocaloric material from high to low value, and decreasing a stress of the elastocaloric material to maintain a constant volume fraction of corresponding martensite form during temperature decrease, decreasing the stress of the elastocaloric material, till the stress reaches a minimum stress value or the elastocaloric material transitions from martensite to austenite form and increasing the temperature of the elastocaloric material from low to high value, and increasing the stress of the elastocaloric material to maintain a constant volume fraction of corresponding martensite form during temperature increase.

7 Claims, 17 Drawing Sheets

(56) References Cited

OTHER PUBLICATIONS

Qian Suxin et al: "Performance enhancement of a compressive thermoelastic cooling system using multi-objective optimization and novel designs", International Journal of Refrigeration, Elsevier, Amsterdam, NL vol. 57, May 1, 2015 (May 1, 2015), pp. 62-76, xp029280489, ISSN: 0140-7007, DOI: 10.1016/J.IJREFRIG.2015.04.012.
International Search Report issued in PCT/EP2023/058061, mailed Jul. 27, 2023 (3 pages).

* cited by examiner

| Stirling | | | |
|---|---|---|---|
| *Process Number* | *Process Type* | *Incremented Parameter* | *Process Exit Condition* |
| 4-1 | Isochoric Temperature Increase | Temperature | T >= TH |
| 1-2 | Isothermal Heat Rejection | Stress | $\sigma >= \sigma_{max}$ OR $\xi = 1$ |
| 2-3 | Isochoric Temperature Decrease | Temperature | T <= TC |
| 3-4 | Isothermal Heat Absorbtion | Stress | $\sigma <= \sigma_{min}$ OR $\xi = 0$ |

302

| Constant martensite [Isophasic] | | | |
|---|---|---|---|
| *Process Number* | *Process Type* | *Incremented Parameter* | *Process Exit Condition* |
| 4-1 | Polytropic Temperature Increase | Temperature | T >= TH |
| 1-2 | Isothermal Heat Rejection | Stress | $\sigma$ >= $\sigma_{max}$ OR $\xi$ = 1 |
| 2-3 | Polytropic Temperature Decrease | Temperature | T <= TC |
| 3-4 | Isothermal Heat Absorbtion | Stress | $\sigma$ <= $\sigma_{min}$ OR $\xi$ = 0 |

| Reverse Stirling Cycle | | | | | |
|---|---|---|---|---|---|
| Condition | $T_{hot}$ | $T_{cold}$ | $Q_{out}$ | COP | Carnot |
| A | 34 | 7 | 7.63 | 6.02 | 11.39 |
| B | 30 | 7 | 8.18 | 6.67 | 13.18 |
| C | 27 | 7 | 8.53 | 7.02 | 15.01 |
| D | 24 | 7 | 8.85 | 7.81 | 17.48 |
| E | 35 | 7 | 7.48 | 5.87 | 11.01 |
| Annual TEWI | 175.5 | *kg/CO2/kg* | SCOP | 7.05 | |

Table I

| Constant Martensitic Heat Recovery | | | | | |
|---|---|---|---|---|---|
| Condition | $T_{hot}$ | $T_{cold}$ | $Q_{out}$ | COP | Carnot |
| A | 34 | 7 | 7.29 | 8.04 | 11.38 |
| B | 30 | 7 | 8.19 | 8.55 | 13.18 |
| C | 27 | 7 | 8.82 | 8.96 | 15.01 |
| D | 24 | 7 | 9.45 | 9.43 | 17.40 |
| E | 35 | 7 | 7.06 | 7.91 | 11.01 |
| Annual TEWI | 141.9 | *kg/CO2/kg* | SCOP | 8.93 | |

Table

FIG.4E

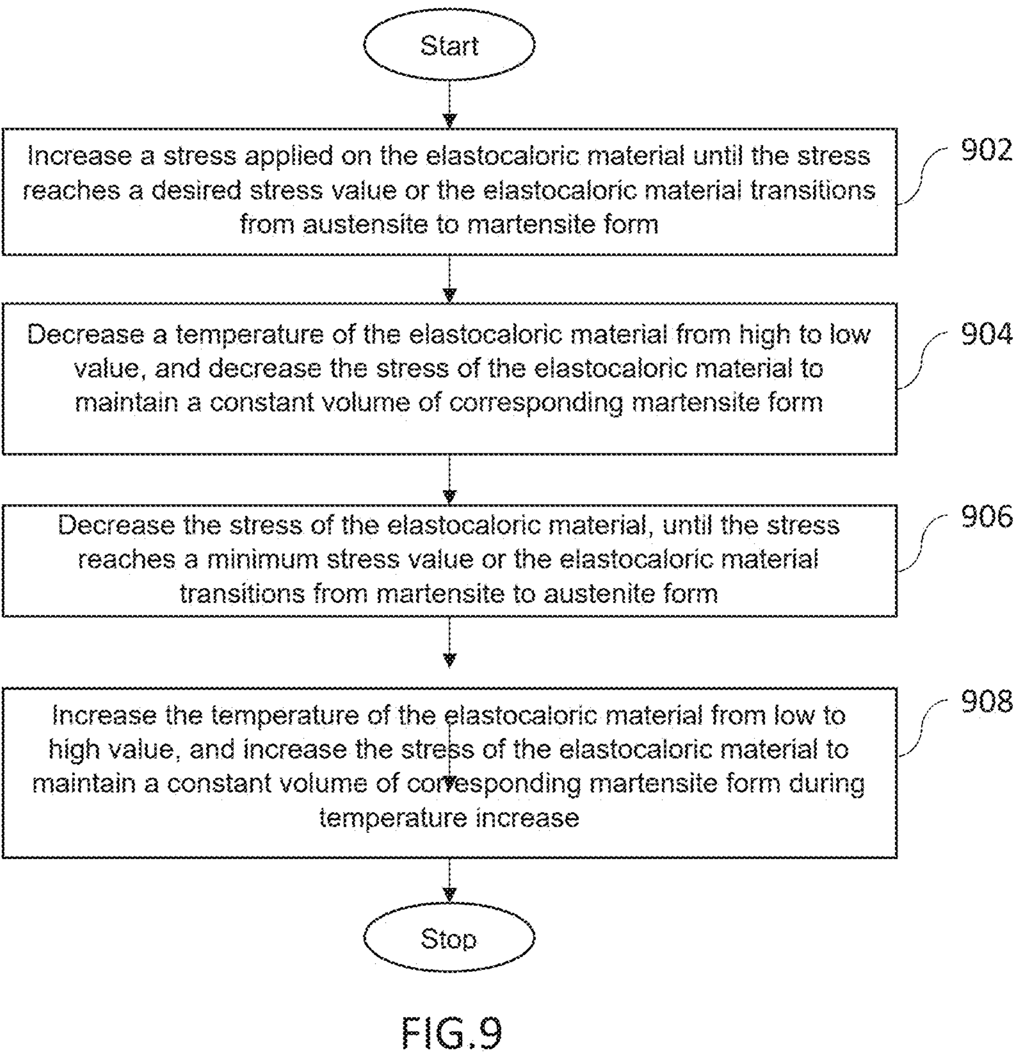
FIG.9
900

1000

SOLID STATE THERMODYNAMIC CYCLE

RELATED APPLICATIONS

This application is a U.S. National Stage of International Application No. PCT/EP2023/058061 filed Mar. 28, 2023, which claims the benefit of Great Britain Patent Application No. 2204339.2, filed on Mar. 28, 2022, each of which is hereby incorporated by reference in its entirety.

FIELD OF THE INVENTION

The present disclosure is directed towards thermodynamic cycles, and more particularly to a thermodynamic cycle for an elastocaloric material.

BACKGROUND OF THE INVENTION

Recent research into Elastocaloric [EC] effect has demonstrated its potential as a solid-state alternative to traditional Vapour Compression refrigeration and heat pumping approaches. The EC cycle takes advantage of the superelastic behaviour of Shape Memory Alloys (SMAs), which facilitates, through cyclic uniaxial loading and unloading, the absorption of heat from a low temperature source and its rejection to a higher temperature sink. Elastocaloric material thermodynamic cycles have previously been modelled using traditional gas cycles. The reverse Brayton and reverse Stirling cycles have been shown in literature to have the best representation of an elastocaloric thermal cycle. It is known from gas cycle theory that the reverse Stirling cycle and the Carnot cycle (thermodynamic limit) coefficients of performance (COP) are identical as both use isothermal heat rejection and absorption processes. Therefore, an elastocaloric material aiming to maximise its COP would aim to implement a reverse Stirling cycle where possible. FIG. 1 illustrates the key processes for the Stirling cycle. As can be seen, heat rejection and heat absorption are isothermal processes, and the heat recovery processes which preheat and precool the SMA are isochoric or constant material volume processes.

However, past modelling of elastocaloric thermodynamic cycles has been performed assuming a full phase change from austenite to martensite. A real elastocaloric material may only partially transform between phases due to temperature or stress limitations.

FIGS. 2A-2D are graphs illustrating relationships between stress vs temperature, stress vs strain, specific entropy vs temperature, and specific entropy vs Martensitic volume, respectively, when the elastocaloric material undergoes the reverse Stirling cycle. It can be seen from FIG. 2D that during the heat recovery process from 2-3 (material cooling), the martensite volume increases, and during the process from 4-1 (material heating), the martensite volume decreases. The resulting increase/decrease in martensitic volume is found to be larger with higher temperatures. This is due to the limited martensitic volume change during the heat rejection process owing to the operating stress limit. Also, in FIG. 2B, the observable strain from 2-3 (material cooling) remains constant due to thermal expansion and elastic strain decreasing and the phase change strain increasing with martensitic volume.

However, the quantity of heat rejected is linked to the martensitic volume and therefore an increase would cause further heat to be rejected. A real heat recovery system requires heat addition and rejection but in this case the heat rejected is due to a fundamental process imbalance which the physical design does not control. The same is true for the heat recovery process. This means that the heat recovery device must handle higher thermal loads. In addition, the martensitic volume change during heat recovery increases with larger operating temperature deltas. This is due to a lower martensitic volume increase on heat rejection caused by the operating stress.

Hence, in view of the above, there is a need for a system and method that maintains constant martensite volume during the heat recovery process, and reduces the losses incurred due to the increase in martensitic volume during heat recovery process.

SUMMARY OF THE INVENTION

According to the invention there is provided, as set out in the appended claims, a method for implementing a thermodynamic cycle for an elastocaloric material. The method includes increasing a stress applied on the elastocaloric material, till the stress reaches a desired stress value or the elastocaloric material transitions from austenite to martensite form; decreasing a temperature of the elastocaloric material from high to low value, and decreasing a stress of the elastocaloric material to maintain a constant volume fraction of corresponding martensite form during temperature decrease; decreasing the stress of the elastocaloric material, till the stress reaches a minimum stress value or the elastocaloric material transitions from martensite to austenite form; and increasing the temperature of the elastocaloric material from low to high value, and increasing the stress of the elastocaloric material to maintain a constant volume fraction of corresponding martensite form during temperature increase.

In an embodiment of the present invention, increasing the stress of the elastocaloric material to the desired stress value forms an isothermal heat rejection process, and decreasing the stress forms an isothermal heat absorption process.

In an embodiment of the present invention, decreasing the stress to maintain a constant volume fraction of the martensite form during temperature decrease forms a polytropic temperature decrease process, and increasing the stress of the elastocaloric material to maintain a constant volume fraction of the martensite form during temperature increase forms a polytropic temperature increase process.

In an embodiment of the present invention, the change in stress during polytropic temperature increase and decrease processes is calculated using the formula:

$$\dot{\sigma} = -\frac{(\Delta\alpha : \sigma + \rho\Delta s_o)\dot{T}}{(\Delta S : \sigma + \Lambda)}$$

Where Δα is the difference in thermal expansion between phases, σ is the current material stress, ρΔso is the volumetric entropy difference between phases which may be determined from the Clausius Clapeyron relation, ΔS is the material stiffness, Λ is the material transformation strain and T dot is change in temperature.

In an embodiment of the present invention, the change in stress is directly proportional to the change in temperature and entropy difference, and inversely proportional to the material stiffness and material transformation strain.

In an embodiment of the present invention, the maintaining of constant martensite volume during polytropic temperature increase and decrease processes reduces the overall work input of the thermodynamic cycle, and increases the COP.

The present invention discloses a method of implementing a thermodynamic cycle in that by maintaining a constant martensitic volume during heat recovery processes, the latent heat rejection/absorption during heat recovery is removed and, therefore, the overall efficiency of the cycle is increased as a lower work input. The new thermodynamic cycle is specific only to solid-solid phase changes and improves the part load efficiency of an elastocaloric material by 25% over reverse Stirling under identical conditions, by varying the stress with temperature on the heat recovery process. The new thermodynamic cycle increases the efficiency of elastocaloric technology used in heating or cooling applications without increasing the system cost or parasitic loads, as well as increasing the commercial attractiveness of SMA. Also, material hysteresis is reduced as unnecessary energy rejection/absorption is removed, leading to higher COP and reduced parasitic loss.

In another aspect of the present invention, there is provided a heat pump system using the method of implementing a thermodynamic cycle.

In yet another aspect of the present invention, there is provided a refrigeration system using the method of implementing a thermodynamic cycle.

In yet another aspect of the present invention, there is provided a system for implementing a thermodynamic cycle for an elastocaloric material. The system includes an isothermal heat rejection module for increasing a stress applied on the elastocaloric material, until the stress reaches a desired stress value or the elastocaloric material transitions from austenite to martensite form, a polytropic temperature decrease module for decreasing a temperature of the elastocaloric material from high to low value, and decreasing a stress of the elastocaloric material to maintain a constant volume fraction of corresponding martensite form during temperature decrease; an isothermal heat absorption module for decreasing the stress of the elastocaloric material, until the stress reaches a minimum stress value or the elastocaloric material transitions from martensite to austenite form; and a polytropic temperature increase module increasing the temperature of the elastocaloric material from low to high value, and increasing the stress of the elastocaloric material to maintain a constant volume fraction of corresponding martensite form during temperature increase.

BRIEF DESCRIPTION OF THE DRAWINGS

The invention will be more clearly understood from the following description of an embodiment thereof, given by way of example only, with reference to the accompanying drawings, in which:—

FIG. 4E shows Tables 1 and 2 for comparing various parameters of the reverse Stirling cycle and the thermodynamic cycle of FIG. 3;

FIG. 9 is a flowchart illustrating a method for implementing the thermodynamic cycle of FIG. 3.

DETAILED DESCRIPTION

Figure 3:
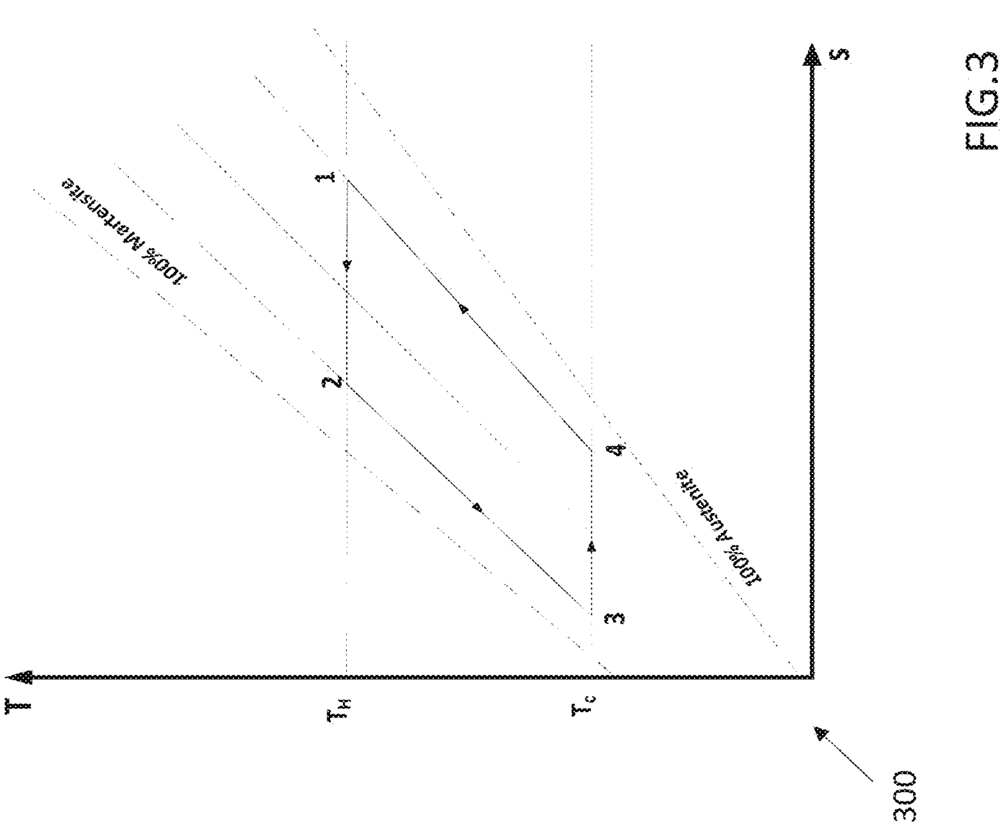
FIG. 3 illustrates a new thermodynamic cycle and corresponding thermodynamic table for an elastocaloric material, in accordance with an embodiment of the present invention.

FIG. 3 illustrates a new thermodynamic cycle 300 and corresponding thermodynamic table 302 for an elastocaloric material, in accordance with an embodiment of the present invention.

The thermodynamic cycle 300 includes a series of four thermodynamic processes 4-1, 1-2, 2-3 and 3-4, corresponding to transitions among states 1, 2, 3 and 4 of the elastocaloric material. The modelling of the thermodynamic cycle 300 has been performed assuming a full phase change from austenite to martensite. However, a real elastocaloric material may only partially transform (approx. 90%) between phases due to temperature or stress limitations. It would be apparent to one of ordinary skill in the art that the thermodynamic cycle 300 may be applied to other caloric materials, if they have a hysteresis.

The thermodynamic cycle 300 uses an isothermal heat rejection process (process 1-2) and isothermal heat absorption process (process 3-4), similar to the reverse Stirling cycle. However, instead of an isochoric heat recovery process during process 2-3, a constant martensitic volume process is used instead. The thermodynamic cycle 300 may also be referred to as an isophasic cycle due to constant volume fraction of martensite during process 2-3. The constant martensitic volume is achieved by controlling the applied stress to the material during the heat recovery process of the cycle, where the material is to be heated/cooled between the temperature extremes. It is to be noted that the constant martensite and austenite volume is achieved by controlling stress to both processes 2-3 and 4-1.

The first thermodynamic process (process number 4-1) includes a polytropic temperature increase process during which the temperature of the elastocaloric material is raised from a cold temperature Tc to a hot temperature TH. The first thermodynamic process starts at fourth state, when the temperature of the elastocaloric material is Tc, and ends when the temperature is TH. During the first process, the elastocaloric material includes approximately 90% austenite and 10% Martensite. During the first process (4-1), the stress of the elastocaloric material may be increased to maintain the constant martensite volume for a given temperature. The increase in stress during process (4-1) may be estimated based on the equation (1), as explained later.

The second thermodynamic process (process number 1-2) includes an isothermal heat rejection process during which the stress applied on the elastocaloric material is increased. The second thermodynamic process starts at first state, and ends at second state, when the stress applied reaches a desired value, i.e., maximum stress value, or when $\xi=1$. In the second process, the elastocaloric material transitions from Austenite to Martensite form. $\xi$ is the martensite volume fraction. When $\xi=0$, the material is full Austenite, and when $\xi=1$ the material is full Martensite.

The third thermodynamic process (process number 2-3) includes a polytropic temperature decrease process during which the temperature of the elastocaloric material is lowered from a hot temperature $T_H$ to a cold temperature $T_c$. The third thermodynamic process starts at second state when the temperature of the elastocaloric material is $T_H$, and ends at third state, when the temperature of the elastocaloric material is less than or equal to $T_c$. In the third process, the elastocaloric material remains in martensite form. During the first process (4-1), the stress of the elastocaloric material may be decreased to maintain the constant martensite volume for a given temperature. The decrease in stress during process (4-1) may be estimated based on the equation (1), as explained later.

The fourth thermodynamic process (process number 3-4) includes an isothermal heat absorption process during which the stress applied on the elastocaloric material is decreased. The fourth thermodynamic process starts at third state, and ends at fourth state, when the stress applied decreases to a minimum stress value, when $\xi=0$. In the fourth process, the elastocaloric material transitions from martensite to austenite form.

The ideal change in stress required during processes 2-3 and 4-1 can be calculated using the following formula:

$$\dot{\sigma} = -\frac{(\Delta\alpha : \sigma + \rho\Delta s_o)\dot{T}}{(\Delta S : \sigma + \Lambda)} \quad (1)$$

Where $\Delta\alpha$ is the difference in thermal expansion between phases, $\sigma$ is the current material stress, $\rho\Delta so$ is the volumetric entropy difference between phases which may be determined from the Clausius Clapeyron relation, $\Delta S$ is the material stiffness, $\Lambda$ is the material transformation strain and T dot is the change in temperature.

As seen from equation (1), the change in stress is directly proportional to the change in temperature during phases and the entropy difference between phases, and inversely proportional to the material stiffness and material transformation strain. During processes 4-1 and 2-3, only the stress and temperature should change as all the other parameters are fixed to the material. However, the thermal expansion and transformation strain would impact the volume change required to change stress by a certain amount. In general, if everything increases then the stress change would need to be larger to keep the martensitic volume constant.

Further, an offset may be included by the designer to reject a controlled amount of latent heat to the heat recovery system to maintain heat recovery temperatures.

FIGS. 4A-4D are graphs illustrating relationships between stress vs temperature, stress vs strain, specific entropy vs temperature, and specific entropy vs martensitic volume, respectively, when the thermodynamic cycle 300 is carried out for a low temperature space heating application of an elastocaloric material.

Figure 1:
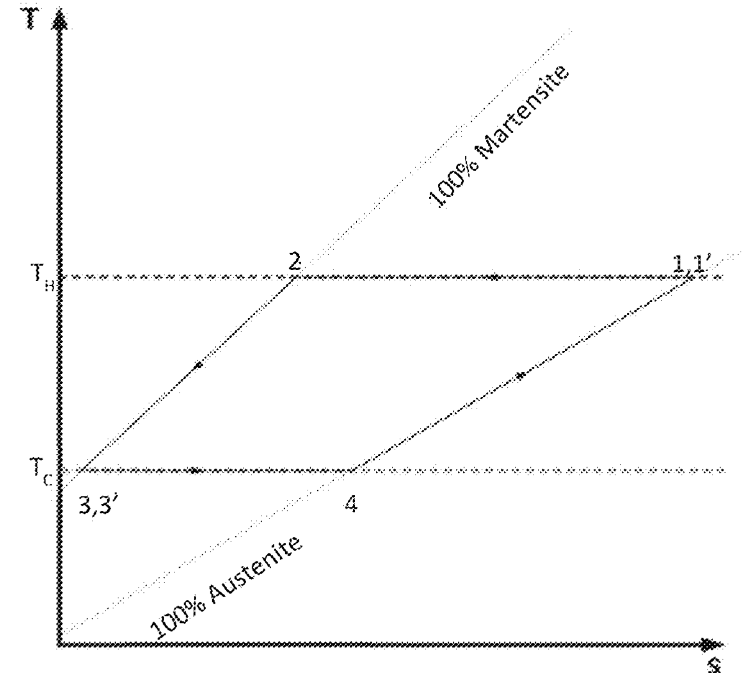
FIG. 1 illustrates a conventional reverse Stirling cycle.
Figure 2A:
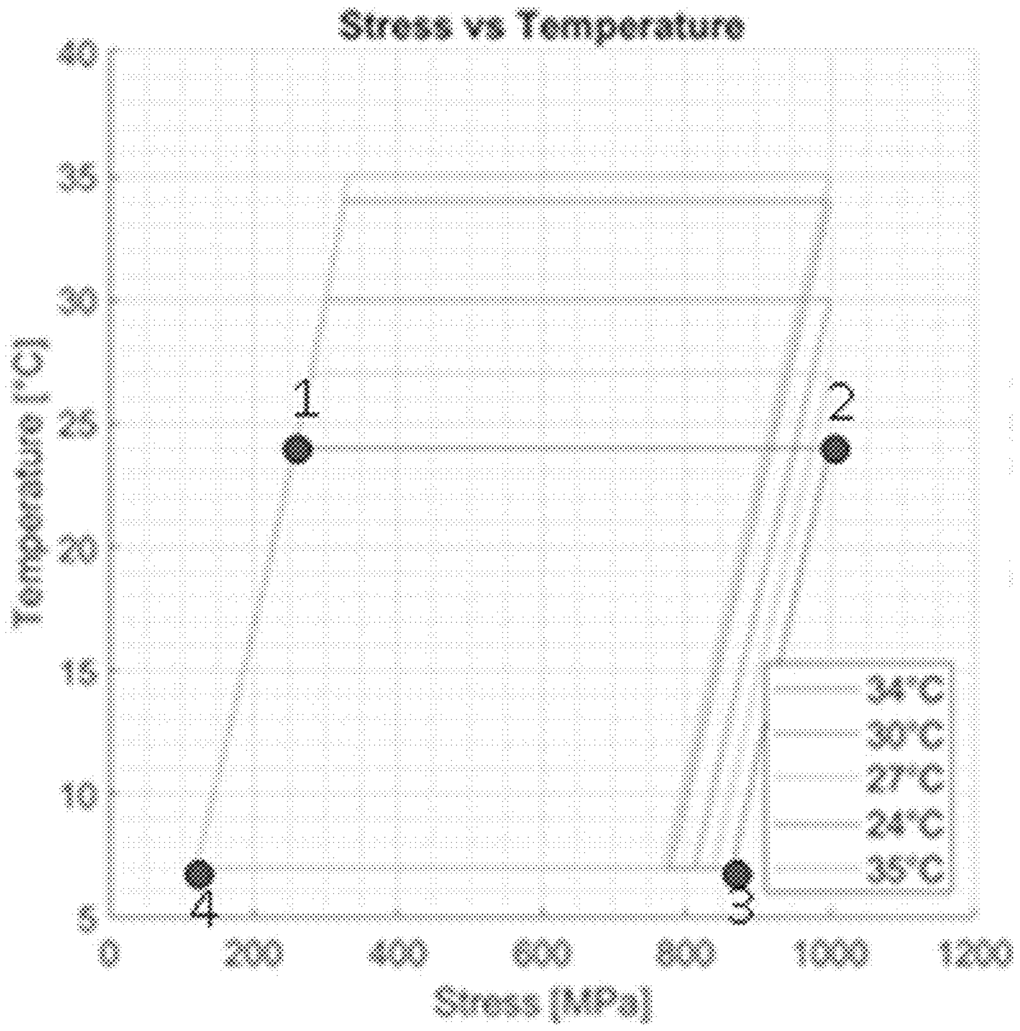
FIGS. 2A-2D are graphs illustrating relationships between stress vs temperature, stress vs strain, specific entropy vs temperature, and specific entropy vs martensitic volume, respectively, when the elastocaloric material undergoes the reverse Stirling cycle.
Figure 2B:
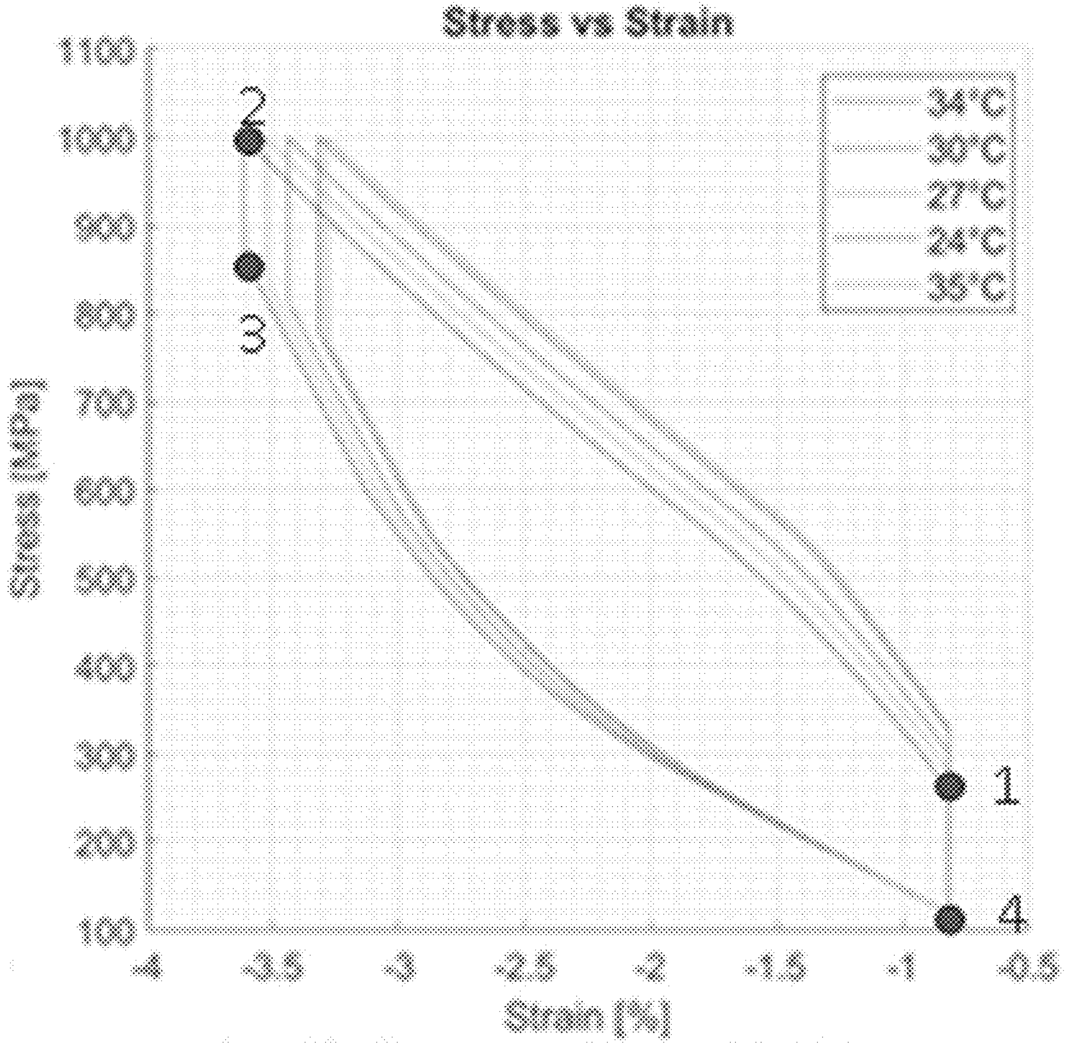
Figure 2C:
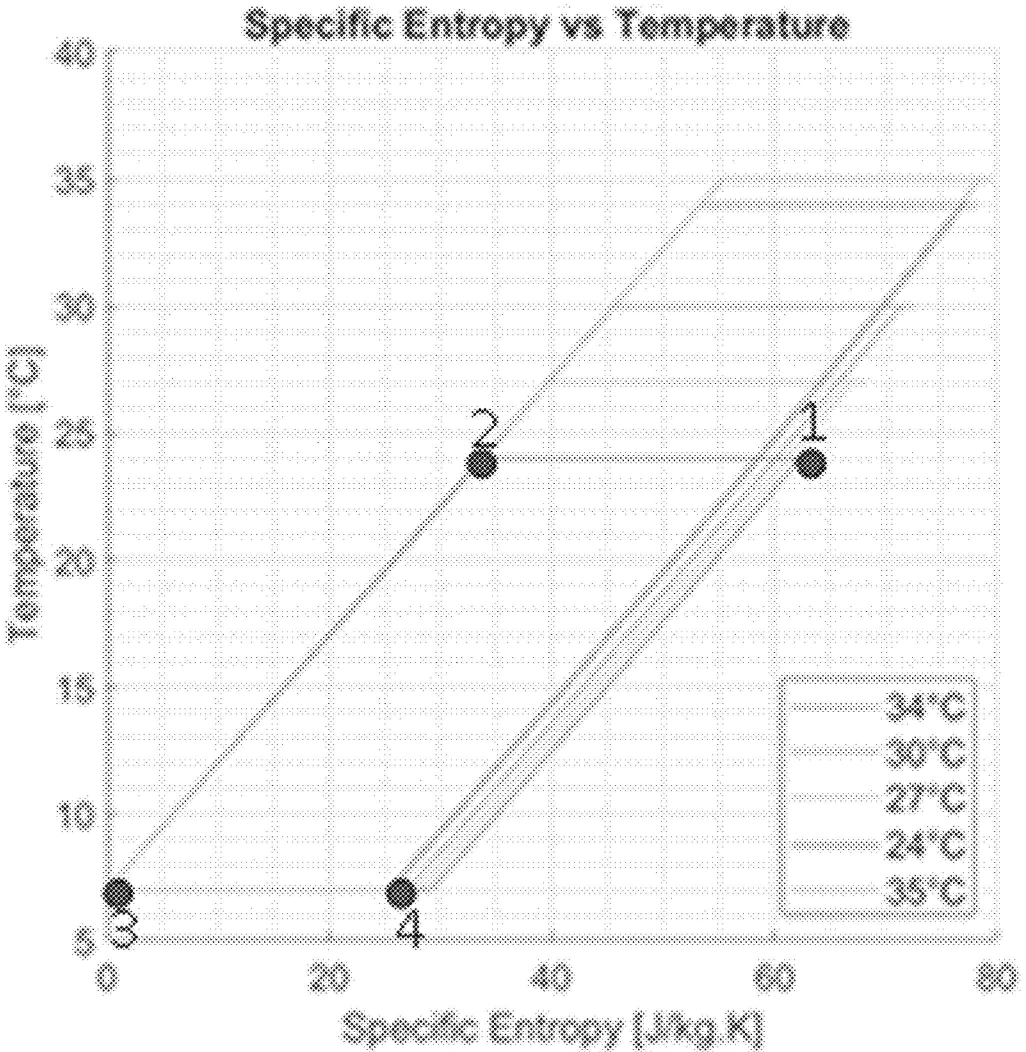
Figure 2D:
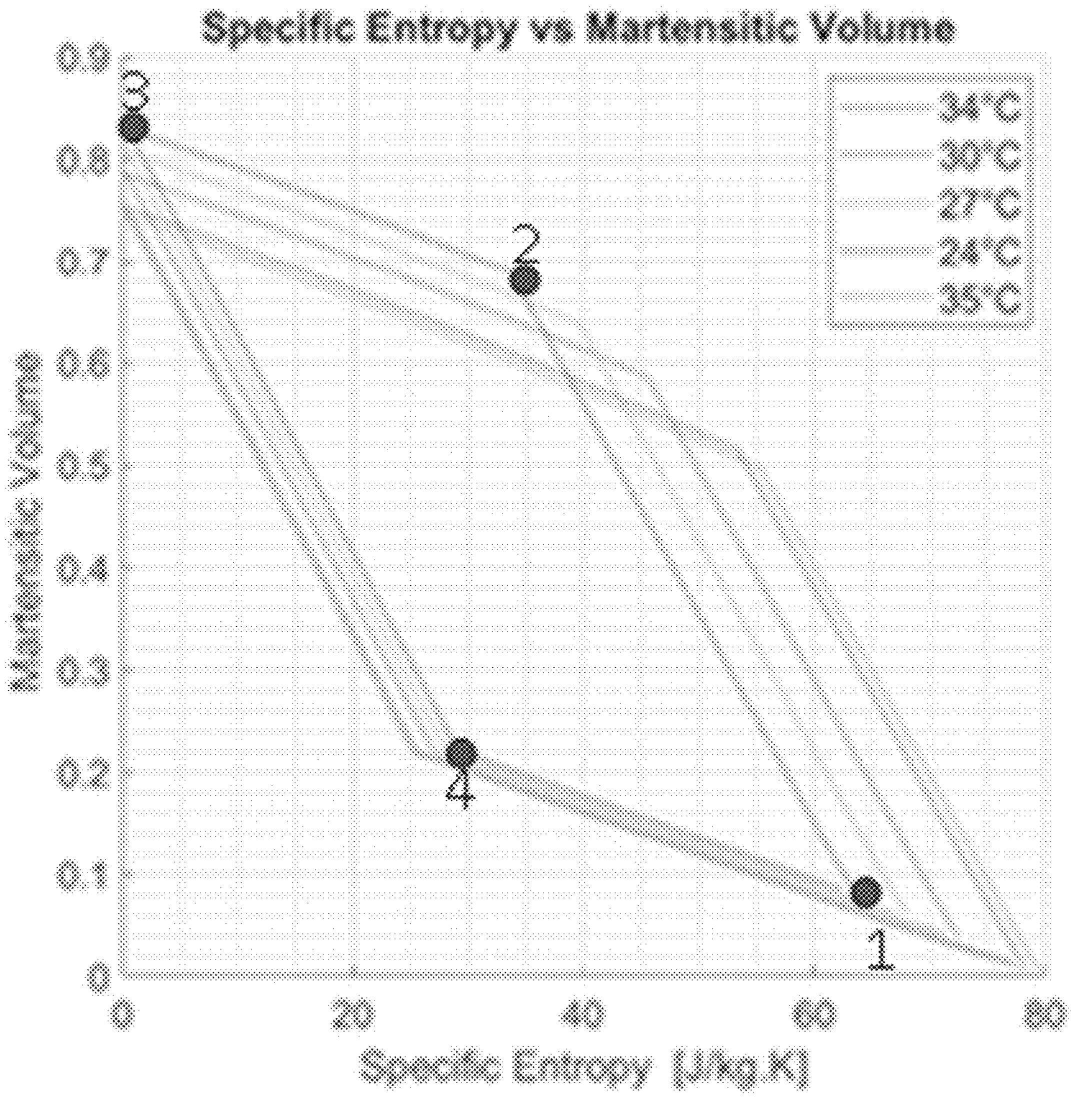
Figure 4A:
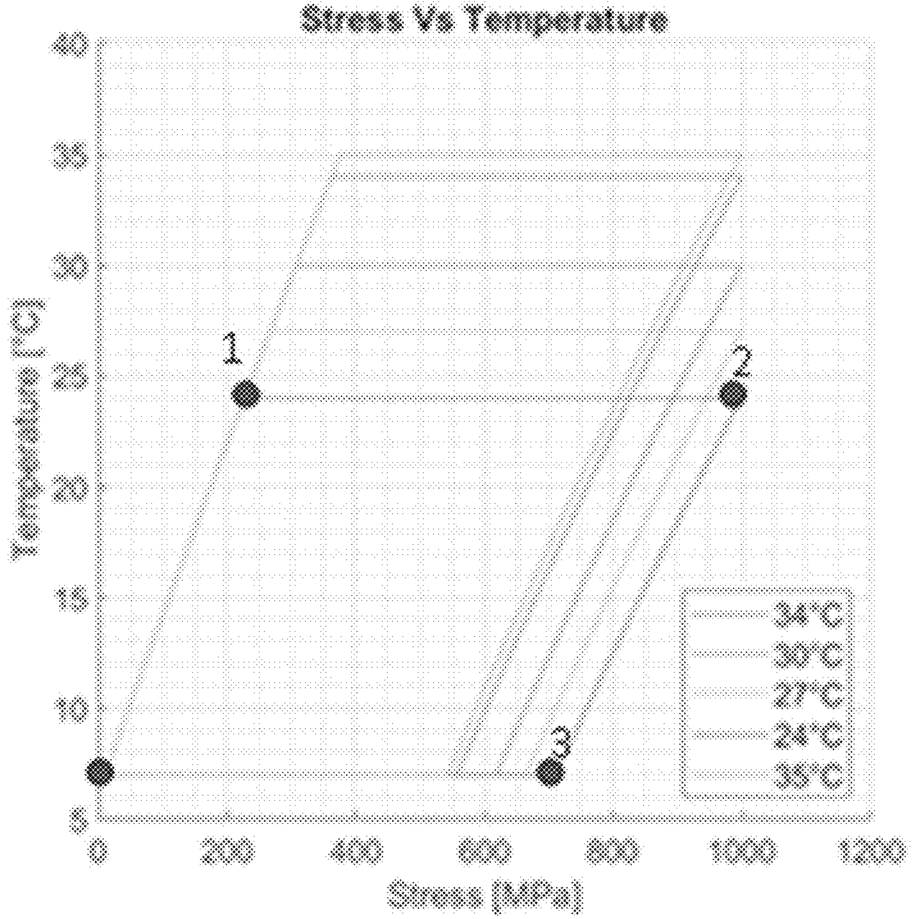
FIGS. 4A-4D are graphs illustrating relationships between stress vs temperature, stress vs strain, specific entropy vs temperature, and specific entropy vs martensitic volume, respectively, when the thermodynamic cycle of FIG. 3 is applied to an elastocaloric material.
Figure 4B:
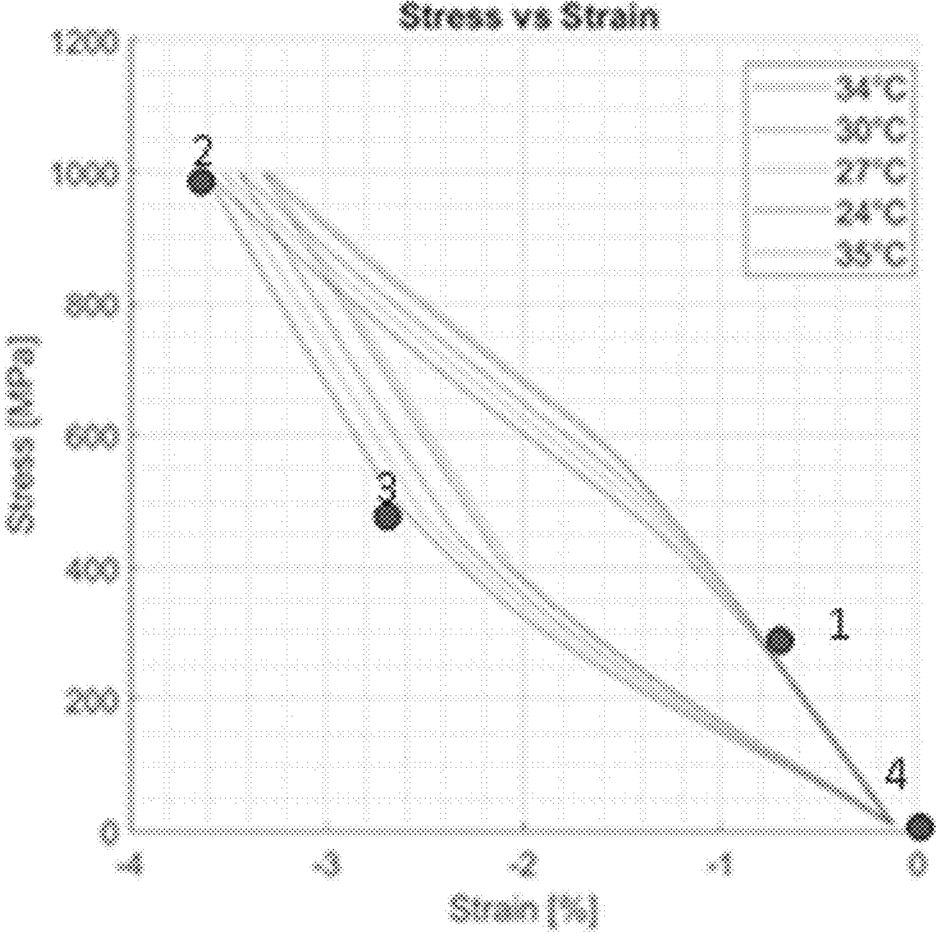
Figure 4C:
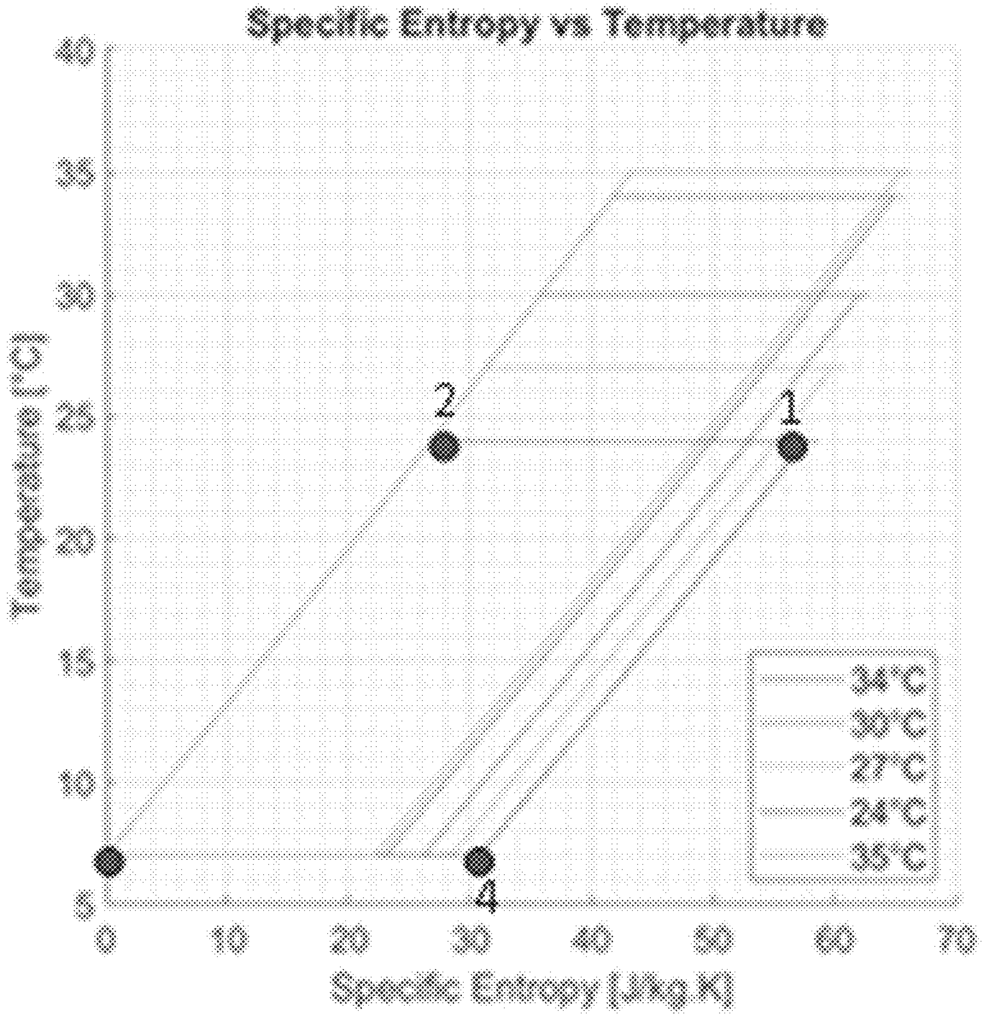
Figure 4D:
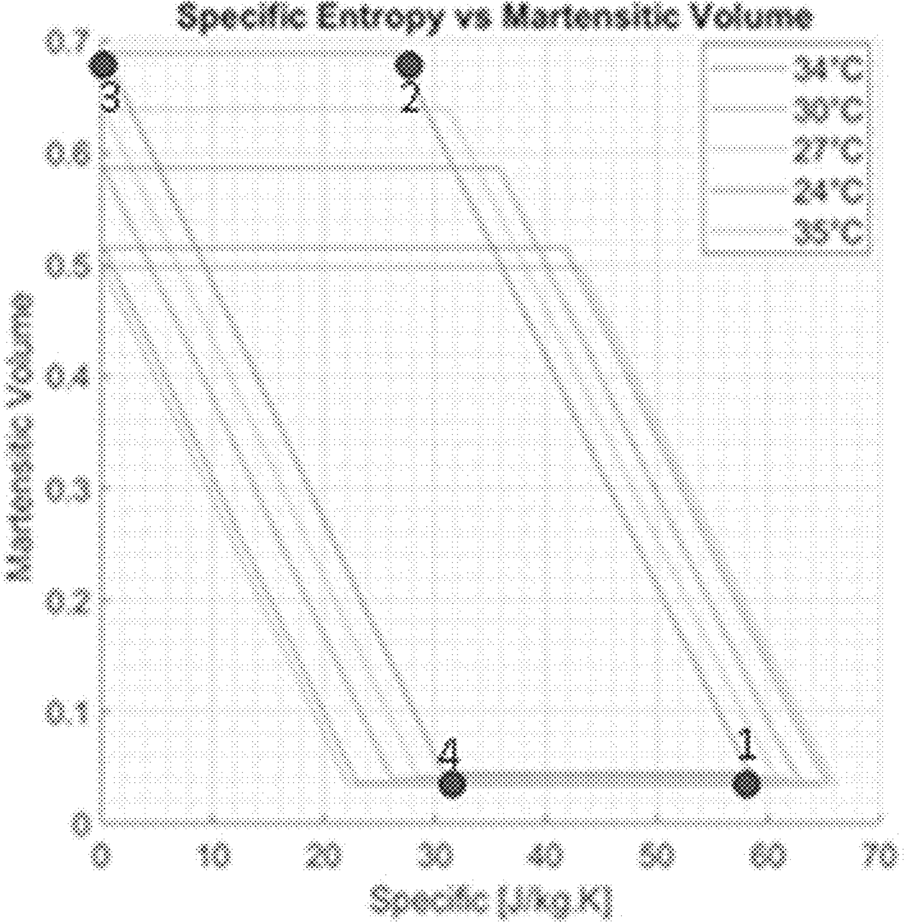

FIG. 4D illustrates the constant martensitic volume of the elastocaloric material during processes 2-3 and 4-1, as compared to variable martensitic volume of the elastocaloric material during processes 2-3 and 4-1 of the reverse Stirling cycle (shown in FIG. 2D). When compared to the reverse Stirling cycle, it can be seen that the martensitic volume is maintained during the heat recovery processes 2-3 and 4-1.

FIG. 4B illustrates the stress vs strain relationship of the elastocaloric material upon undergoing the thermodynamic cycle 300. In FIG. 4B, the stress and volume decrease/increase during these processes for the same maximum operating stress. The material stress at the start of the heat rejection process (process 1-2) was found to be 31 MPa lower than that of the reverse Stirling cycle and 154 MPa higher at the start of the heat absorption process (process 3-4).

The impact of maintaining constant martensite/austenite volume can be seen on the stress-strain plot, where varying the stress during the heat recovery processes results in a change of strain and an overall reduction in the enclosed area and the resulting work input. The ideal work input into a typical thermodynamic cycle can be measured by determining the enclosed area of the pressure-volume diagram or in this case the stress-strain diagram. Upon comparing the stress vs strain graph of FIG. 4B with that of FIG. 2B, it is found that the work input is reduced in the thermodynamic cycle 300. FIG. 4E shows Tables 1 and 2 for comparing various parameters of the reverse Stirling cycle and the thermodynamic cycle 300 (also referred to as constant martensite heat recovery cycle and isophasic cycle) at various temperature conditions. It can be seen that the thermodynamic cycle 300 has a higher theoretical Seasonal Coefficient of Performance (SCOP) when compared to that of the reverse Stirling cycle. The SCOP limit of the thermodynamic cycle 300 is calculated to be 8.93, which is 26% higher than that for the reverse Stirling cycle. Also, the total equivalent warming impact (TEWI) may be used to calculate the CO2 contribution of the installed system over its lifetime. The TEWI of the elastocaloric material may be calculated based on the following equation:

$$TEWI = [n \times E_{annual} \times \beta] + [GWP_i \times m_i \times (1 - \alpha_i)]$$

Where, GWPi is the mass of any insulating or other GWP materials not necessarily refrigerant, n is the operational life of the system in years, Eannual is the energy consumed by the system per year, mi is the mass of the insulating or other GWP materials used, $\beta$ is the quantity of CO2 produced, and $\alpha$ is recoverability at end of life.

Figure 5:
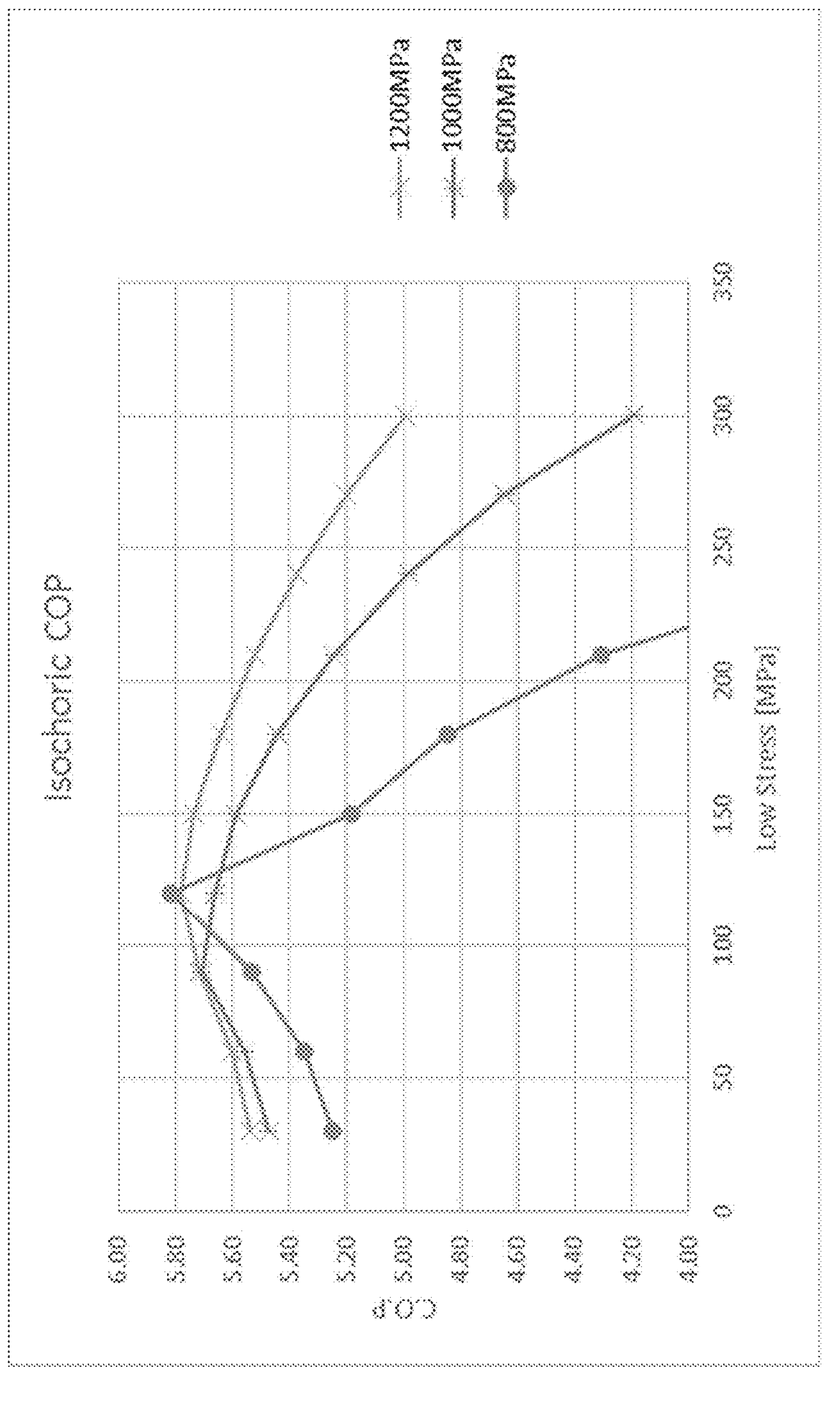
FIG. 5 is a COP vs stress graph for an isochoric cycle, i.e., reverse Stirling cycle.
Figure 6:
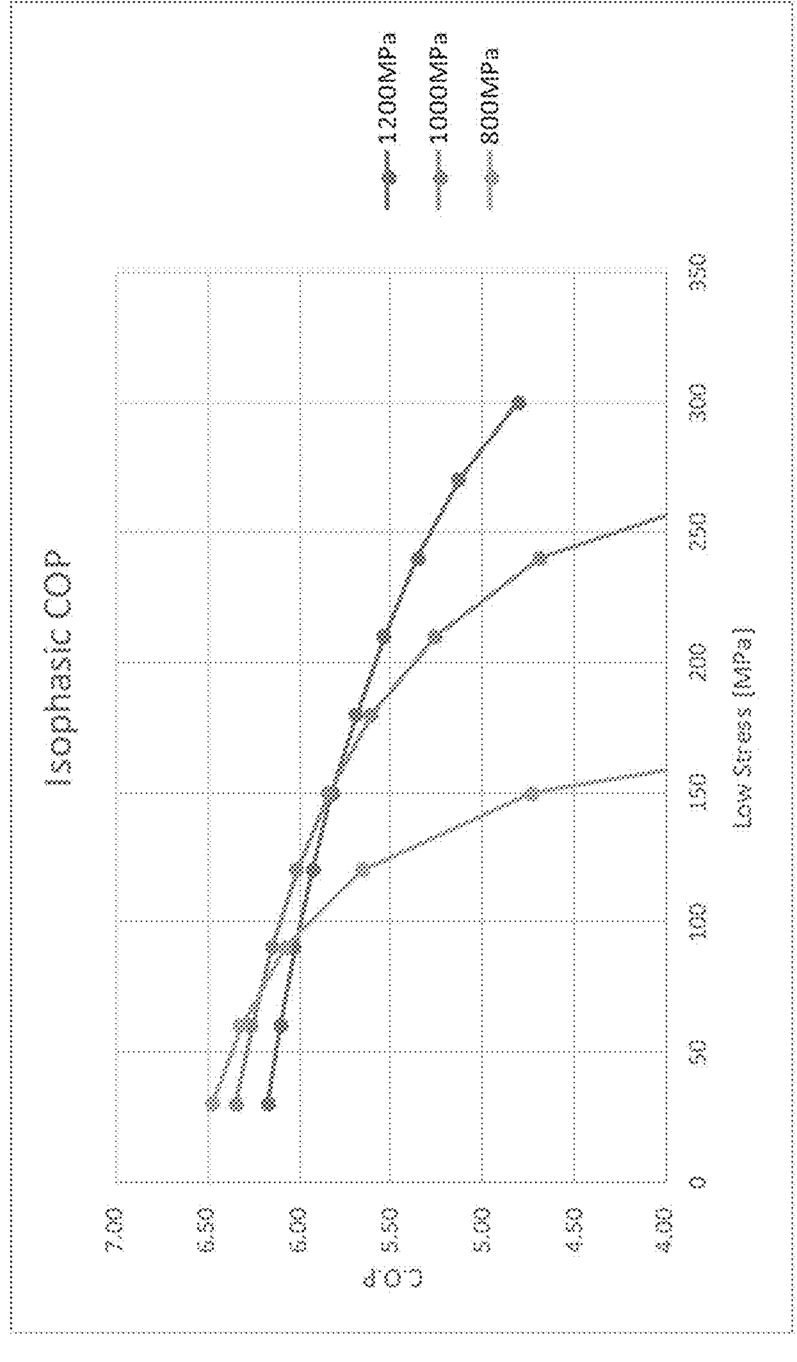
FIG. 6 is a COP vs stress graph for an isophasic cycle, i.e., thermodynamic cycle of FIG. 3.

FIG. 5 shows the COP vs stress graph for an isochoric cycle, i.e., reverse Stirling cycle and FIG. 6 shows the COP vs stress graph for an isophasic cycle, i.e., thermodynamic cycle 300. It can be seen that the thermodynamic cycle 300 removes the need for a minimum operating stress for the elastocaloric material. However, a 10 MPa minimum may be applied for model stability and to prevent the force direction from reversing at low stresses.

The minimum operating stress is purely based on the material activation temperatures and current low side temperature. The thermodynamic cycle 300 would not remove the need for a minimum operating stress in all situations.

The material activation temperatures can be increased by increasing the stress. So, if the austenite finish temperature is too low, a minimum stress may be applied to increase this.

Balancing the cycle is important because in the Stirling cycle, the heat is rejected due to the martensite change at 2-3 and then reabsorbed between 4-1. The same fluid is used for 2-3 and 4-1. So, an imbalance of heat decreases the efficiency of the heat recovery.

Figure 7:
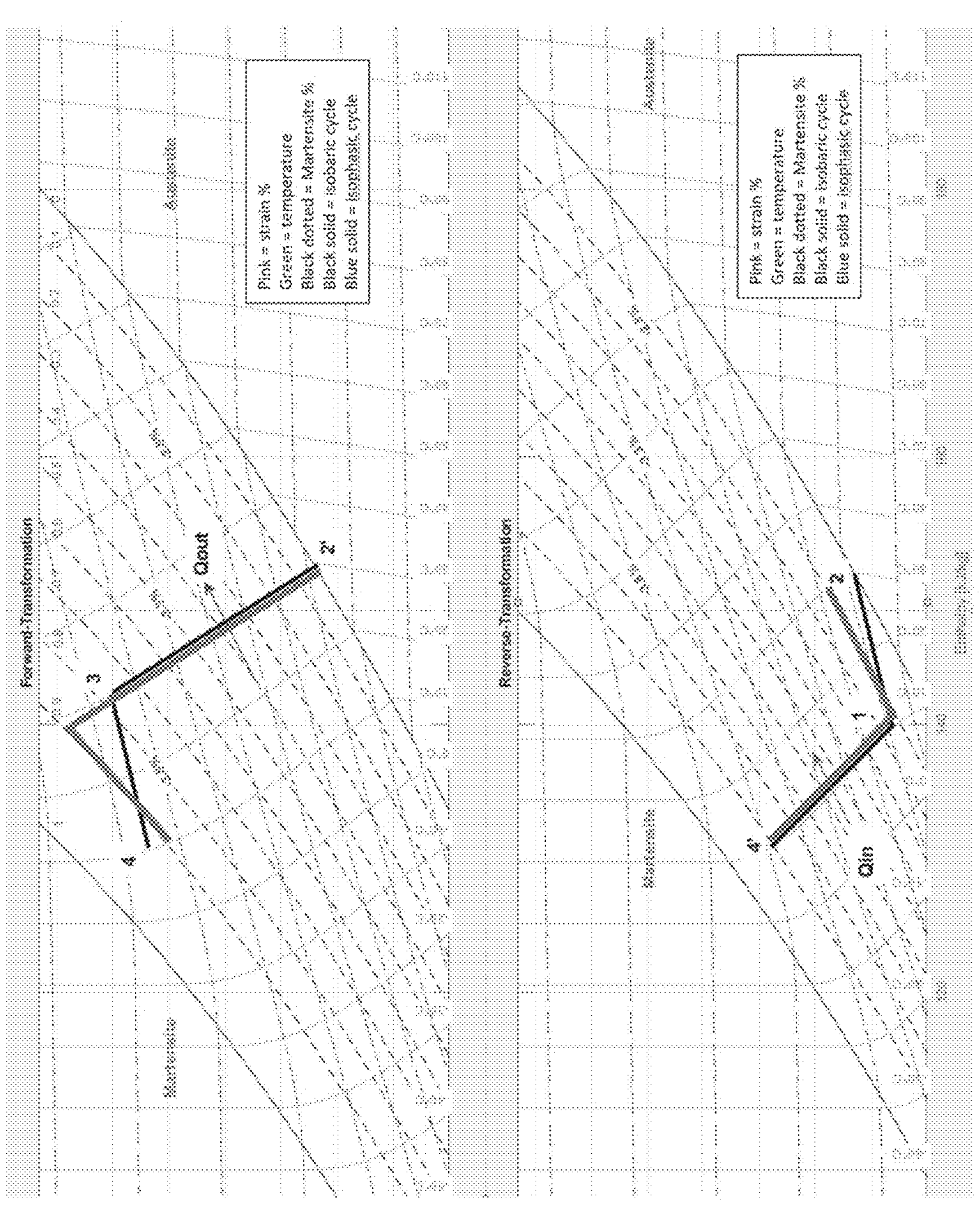
FIG. 7 illustrates the "tails" of the stress-strain curves for an SMA material for the reverse Stirling cycle and the thermodynamic cycle of FIG. 3.

FIG. 7 illustrates the "tails" of the stress-strain curves for an SMA material for the reverse Stirling cycle (by dark solid black line representative of an isobaric cycle) and thermodynamic cycle 300 (by light solid grey line representative of an isophasic cycle). It is clearly shown that the last few % phase transformation is more demanding in terms of Qin vs Qout than running at more moderate phase change levels. This manifests itself as a reduction in the COP. As seen, in process 2-3, martensite volume would change from 80% to 90% as the temperature drops. The thermodynamic cycle 300 would control the stress loading dynamically to hold a constant 90% martensite as one example.

FIGS. 8(A)-8(C) illustrate a physical implementation of the thermodynamic cycle 300 in a hydraulic system 802 through a pressure regulator 804, in accordance with an embodiment of the present invention.

During the process (2-3), when the material cools from hot to cold, the pressure regulator 804 controls the hydraulic pressure on the core and therefore the material stress, based on the stress rate equation 1 to perform constant martensite or isophasic operation. Alternatively, the pressure supplied to the core could be controlled by varying the torque applied to the hydraulic pump 802.

Figure 8:
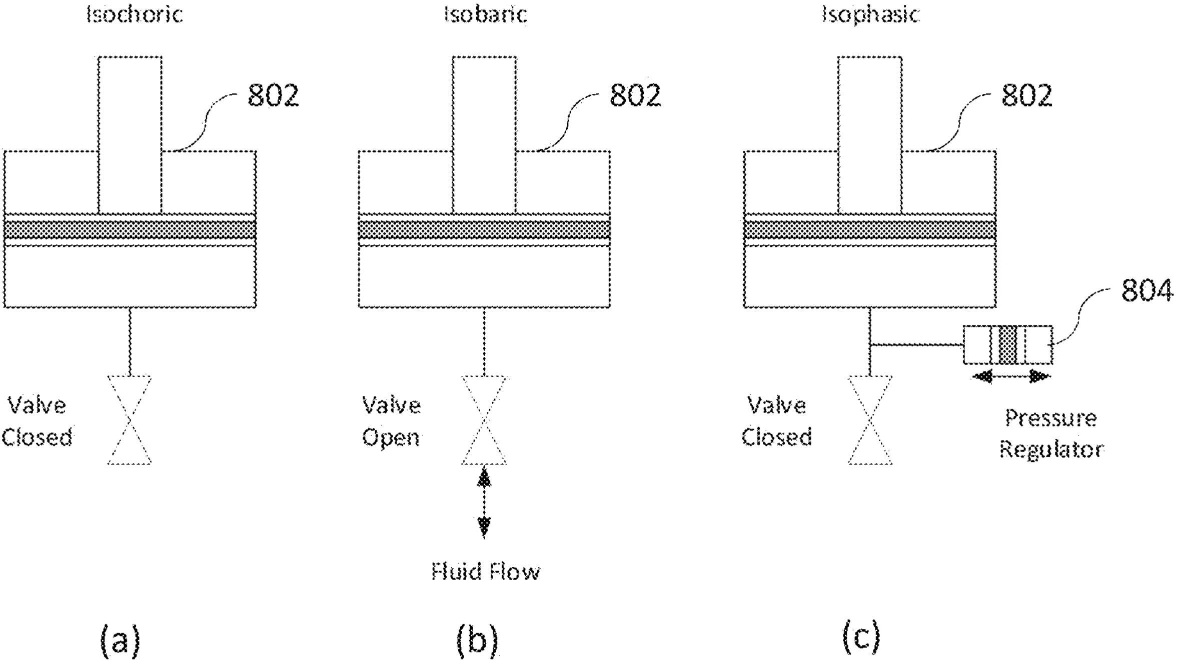
FIGS. 8(A)-8(C) illustrate a physical implementation of the thermodynamic cycle in a hydraulic system through a pressure regulator, in accordance with an embodiment of the present invention.

The pressure regulator 802 may be deactivated, and the hydraulic system 802 could run an isochoric or isobaric process (FIGS. 8 (*a*) and 8(*b*)) in circumstances where a full phase change is achieved.

Although not shown, it would be apparent to one of ordinary skill in the art that the thermodynamic cycle 300 may be implemented in heat pump and refrigeration systems.

FIG. 9 is a flowchart 900 illustrating a method for implementing the thermodynamic cycle 300.

At 902, the method includes increasing a stress applied on the elastocaloric material, until the stress reaches a desired stress value or the elastocaloric material transitions from austenite to martensite form. The increasing the stress of the elastocaloric material to the desired stress value forms an isothermal heat rejection process.

At step 904, the method includes decreasing a temperature of the elastocaloric material from high to low value and decreasing the stress of the elastocaloric material to maintain a constant volume fraction of corresponding martensite form during temperature decrease. The decreasing the stress to maintain a constant volume fraction of the martensite form during temperature decrease, forms a polytropic temperature decrease process.

At step 906, the method includes decreasing the stress of the elastocaloric material, until the stress reaches a minimum stress value or the elastocaloric material transitions from martensite to austenite form. The decreasing the stress forms an isothermal heat absorption process.

At step 908, the method includes increasing the temperature of the elastocaloric material from low to high value and increasing the stress of the elastocaloric material to maintain a constant volume fraction of corresponding martensite form during temperature increase. The increasing the stress of the elastocaloric material to maintain a constant volume fraction of the martensite form during temperature increase, forms a polytropic temperature increase process.

Figure 10:
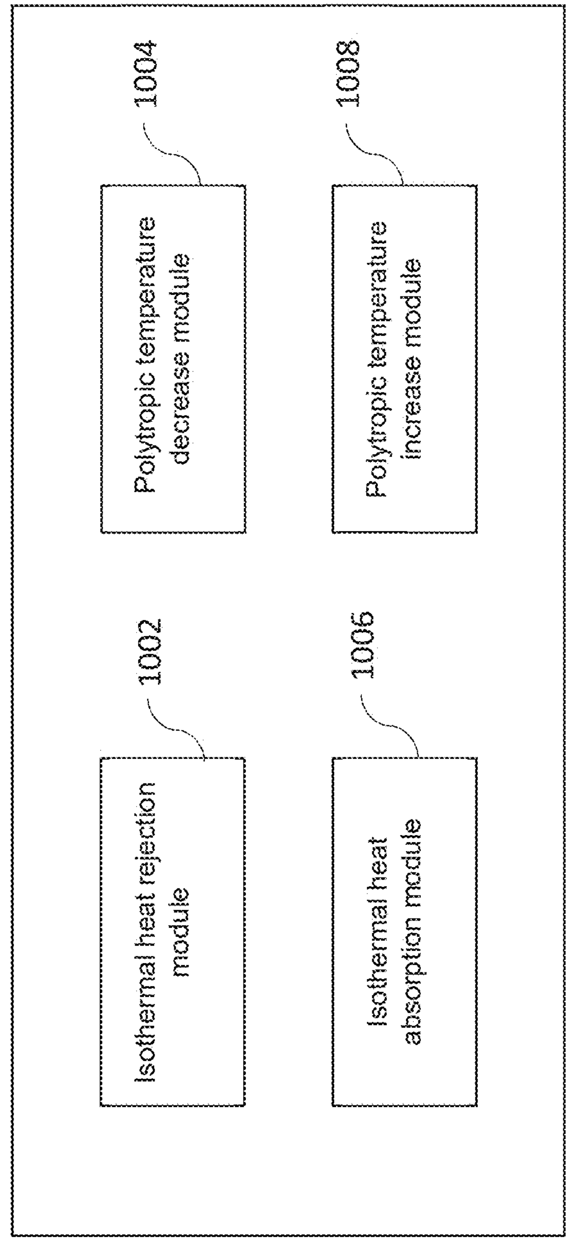
FIG. 10 is a block diagram illustrating a system for implementing the thermodynamic cycle of FIG. 3.

FIG. 10 is a block diagram illustrating a system 1000 for implementing the thermodynamic cycle 300 of FIG. 3.

The system 1000 includes an isothermal heat rejection module 1002 for increasing a stress applied on the elastocaloric material, until the stress reaches a desired stress value or the elastocaloric material transitions from austenite to martensite form, a polytropic temperature decrease module 1004 for decreasing a temperature of the elastocaloric material from high to low value, and decreasing a stress of the elastocaloric material to maintain a constant volume fraction of corresponding martensite form during temperature decrease, an isothermal heat absorption module 1006 for decreasing the stress of the elastocaloric material, until the stress reaches a minimum stress value or the elastocaloric material transitions from martensite to austenite form, and a polytropic temperature increase module 1008 for increasing the temperature of the elastocaloric material from low to high value, and increasing the stress of the elastocaloric material to maintain a constant volume fraction of corresponding martensite form during temperature increase.

In an embodiment of the present invention, the system 1000 may be implemented through a control unit for controlling various components of a thermodynamic system such as heat pump and refrigeration system.

In the specification the terms "comprise, comprises, comprised and comprising" or any variation thereof and the terms include, includes, included and including" or any variation thereof are considered to be totally interchangeable, and they should all be afforded the widest possible interpretation and vice versa.

The invention is not limited to the embodiments hereinbefore described but may be varied in both construction and detail.

What is claimed is:

1. A method for implementing a thermodynamic cycle for an elastocaloric material, the method comprising:

increasing a stress applied on the elastocaloric material, until the stress reaches a desired stress value or the elastocaloric material transitions from austenite to martensite form;

decreasing a temperature of the elastocaloric material from high to low value, and decreasing the stress of the elastocaloric material to maintain a constant volume fraction of corresponding martensite form during temperature decrease;

decreasing the stress of the elastocaloric material, until the stress reaches a minimum stress value or the elastocaloric material transitions from martensite to austenite form; and increasing the temperature of the elastocaloric material from low to high value and increasing the stress of the elastocaloric material to maintain a constant volume fraction of corresponding martensite form during temperature increase;

wherein increasing the stress of the elastocaloric material to the desired stress value forms an isothermal heat rejection process, and decreasing the stress forms an isothermal heat absorption process;

wherein decreasing the stress to maintain a constant volume fraction of the martensite form during temperature decrease forms a polytropic temperature decrease process and increasing the stress of the elastocaloric material to maintain a constant volume fraction of the martensite form during temperature increase forms a polytropic temperature increase process.

2. The method as claimed in claim 1, wherein the change in stress during polytropic temperature increase and decrease processes is calculated using the formula:

$$\dot{\sigma} = -\frac{(\Delta\alpha:\sigma + \rho\Delta s_o)\dot{T}}{(\Delta S:\sigma + \Lambda)}$$

wherein Δα is the difference in thermal expansion between phases, σ is the current material stress, ρΔso is the volumetric entropy difference between phases, ΔS is the material stiffness, Λ is the material transformation strain, and T dot is change in temperature.

3. The method of claim 1, further comprising controlling stress, via a hydraulic system with a pressure regulator, for maintaining constant martensite volume during polytropic temperature increase and decrease processes.

4. The method of claim 1, further comprising implementing a thermodynamic cycle using a heat pump system.

5. The method of claim 1, further comprising implementing a thermodynamic cycle using a refrigeration system.

6. A system for implementing a thermodynamic cycle for an elastocaloric material, the system comprising:

an isothermal heat rejection module for increasing a stress applied on the elastocaloric material, until the stress reaches a desired stress value or the elastocaloric material transitions from austenite to martensite form;

a polytropic temperature decrease module for decreasing a temperature of the elastocaloric material from high to low value, and decreasing a stress of the elastocaloric material to maintain a constant volume fraction of corresponding martensite form during temperature decrease;

an isothermal heat absorption module for decreasing the stress of the elastocaloric material, until the stress reaches a minimum stress value or the elastocaloric material transitions from martensite to austenite form; and a polytropic temperature increase module increasing the temperature of the elastocaloric material from low to high value and increasing the stress of the elastocaloric material to maintain a constant volume fraction of corresponding martensite form during temperature increase;

wherein increasing the stress of the elastocaloric material to the desired stress value forms an isothermal heat rejection process, and decreasing the stress forms an isothermal heat absorption process;

wherein decreasing the stress to maintain a constant volume fraction of the martensite form during temperature decrease forms a polytropic temperature decrease process and increasing the stress of the elastocaloric material to maintain a constant volume fraction of the martensite form during temperature increase forms a polytropic temperature increase process.

7. The system as claimed in claim 6, wherein the change in stress is calculated using the formula:

$$\dot{\sigma} = -\frac{(\Delta\alpha : \sigma + \rho\Delta s_o)\dot{T}}{(\Delta S : \sigma + \Lambda)}$$

wherein Δα is the difference in thermal expansion between phases, σ is the current material stress, ρΔso is the volumetric entropy difference between phases, ΔS is the material stiffness, Λ is the material transformation strain, and T dot is change in temperature.

* * * * *